United States Patent
Adams

(10) Patent No.: US 9,521,860 B2
(45) Date of Patent: Dec. 20, 2016

(54) METHOD AND APPARATUS FOR COOLING AND FLAVORING A BEVERAGE

(71) Applicant: Brandon Adams, Garnavillo, IA (US)

(72) Inventor: Brandon Adams, Garnavillo, IA (US)

(*) Notice: Subject to any disclaimer, the term of this patent is extended or adjusted under 35 U.S.C. 154(b) by 99 days.

(21) Appl. No.: 14/679,970

(22) Filed: Apr. 6, 2015

(65) Prior Publication Data

US 2015/0225162 A1    Aug. 13, 2015

Related U.S. Application Data

(63) Continuation-in-part of application No. 13/934,404, filed on Jul. 3, 2013, now Pat. No. 9,061,805.

(60) Provisional application No. 61/668,481, filed on Jul. 6, 2012.

(51) Int. Cl.

| | | |
|---|---|---|
| *A61J 3/08* | (2006.01) | |
| *A23L 2/56* | (2006.01) | |
| *B65D 81/36* | (2006.01) | |
| *B65D 47/08* | (2006.01) | |
| *B65D 47/26* | (2006.01) | |

(52) U.S. Cl.
CPC .............. *A23L 2/56* (2013.01); *B65D 47/0842* (2013.01); *B65D 47/263* (2013.01); *B65D 81/365* (2013.01); *A23V 2002/00* (2013.01); *F25D 2303/08* (2013.01)

(58) Field of Classification Search
CPC ..................................... A61J 3/08; B65D 1/30
USPC ..... 206/529, 528; 215/258, 306; 249/58, 94, 249/96, 97, 141, 203; 62/457.3, 371, 457.2
See application file for complete search history.

(56) References Cited

U.S. PATENT DOCUMENTS

| | | | |
|---|---|---|---|
| 2,932,386 A | | 4/1960 | Ushkow |
| 3,104,665 A | | 9/1963 | Towns |
| 3,565,389 A | | 2/1971 | Price |
| 4,595,549 A | | 6/1986 | Inouye et al. |
| 5,129,238 A | | 7/1992 | Schwartz et al. |
| 5,609,039 A | | 3/1997 | Green et al. |
| 6,467,299 B1 | * | 10/2002 | Coetzee .................. A61J 1/165 62/371 |
| 6,470,705 B2 | * | 10/2002 | Bride-Flynn ........... A61F 7/103 607/108 |
| 7,185,782 B2 | | 3/2007 | Vilchez, Jr. et al. |
| 7,415,839 B2 | | 8/2008 | Robertson et al. |
| 7,691,626 B2 | | 4/2010 | McCabe et al. |
| 2005/0064069 A1 | | 3/2005 | Adams |
| 2005/0210911 A1 | | 9/2005 | Dyrbye et al. |
| 2005/0247714 A1 | | 11/2005 | Backes et al. |

\* cited by examiner

*Primary Examiner* — King M Chu
(74) *Attorney, Agent, or Firm* — Zarley Law Firm, P.L.C.

(57) ABSTRACT

A device for cooling and flavoring a beverage having an elongated tube with an open first end and an open second end that has a lowered portion is provided. A cap is removably received within the second end and connected to a plunger. The plunger has an elongated shaft that terminates in a tip. The cap has an outward extension that is received in the lowered portion of the elongated tube when the device is in an open position. In the open position the tip extends beyond the open first end allowing liquid to pass through the open first end. In a closed position, the outward extension is not received within the lowered portion and the tip seals the first end of the elongated tube.

7 Claims, 6 Drawing Sheets

METHOD AND APPARATUS FOR COOLING AND FLAVORING A BEVERAGE

CROSS REFERENCE TO RELATED APPLICATION

This application is a continuation-in-part of U.S. Ser. No. 13/934,404 filed Jul. 3, 2013, which claims the benefit of U.S. Provisional Application No. 61/668,481 filed Jul. 6, 2012.

BACKGROUND OF THE INVENTION

This invention relates to devices for cooling beverages and forming ice and more particularly to a method and device that not only forms ice, but that can also be placed in a beverage container.

Devices forming ice and cooling beverages are well known in the art but what is desired is a device that will do both. With devices that form ice for placement in a beverage, as the ice melts the beverage is diluted affecting the taste. Devices for cooling a beverage either are not formed for use with many bottled beverages or contain chemicals which could be harmful if leaked. Further, these devices do not permit for adding flavor to a beverage or mixing multiple liquids. Thus, a need exists in the art for a device and method that address these deficiencies.

Therefore, an objective of the present invention is to provide a method and device that more efficiently cools a beverage.

Another objective of the present invention is to provide a method and device that forms ice for use with bottled beverages.

A still further objective is to provide a device and method that provides easy transport of liquid for mixing.

These and other objectives will be apparent to one of ordinary skill I the art based upon the following written description, drawings, and claims.

SUMMARY OF THE INVENTION

A device for cooling and flavoring a beverage having an elongated tube with an open first end and an open second end that has a lowered portion is provided. A cap is removably received within the second end and connected to a plunger. The plunger has an elongated shaft that terminates in a tip. The cap has an outward extension that is received in the lowered portion of the elongated tube when the device is in an open position. In the open position the tip extends beyond the open first end allowing liquid to pass through the open first end. In a closed position, the outward extension is not received within the lowered portion and the tip seals the first end of the elongated tube.

DETAILED DESCRIPTION OF THE PREFERRED EMBODIMENT

Figure 1:
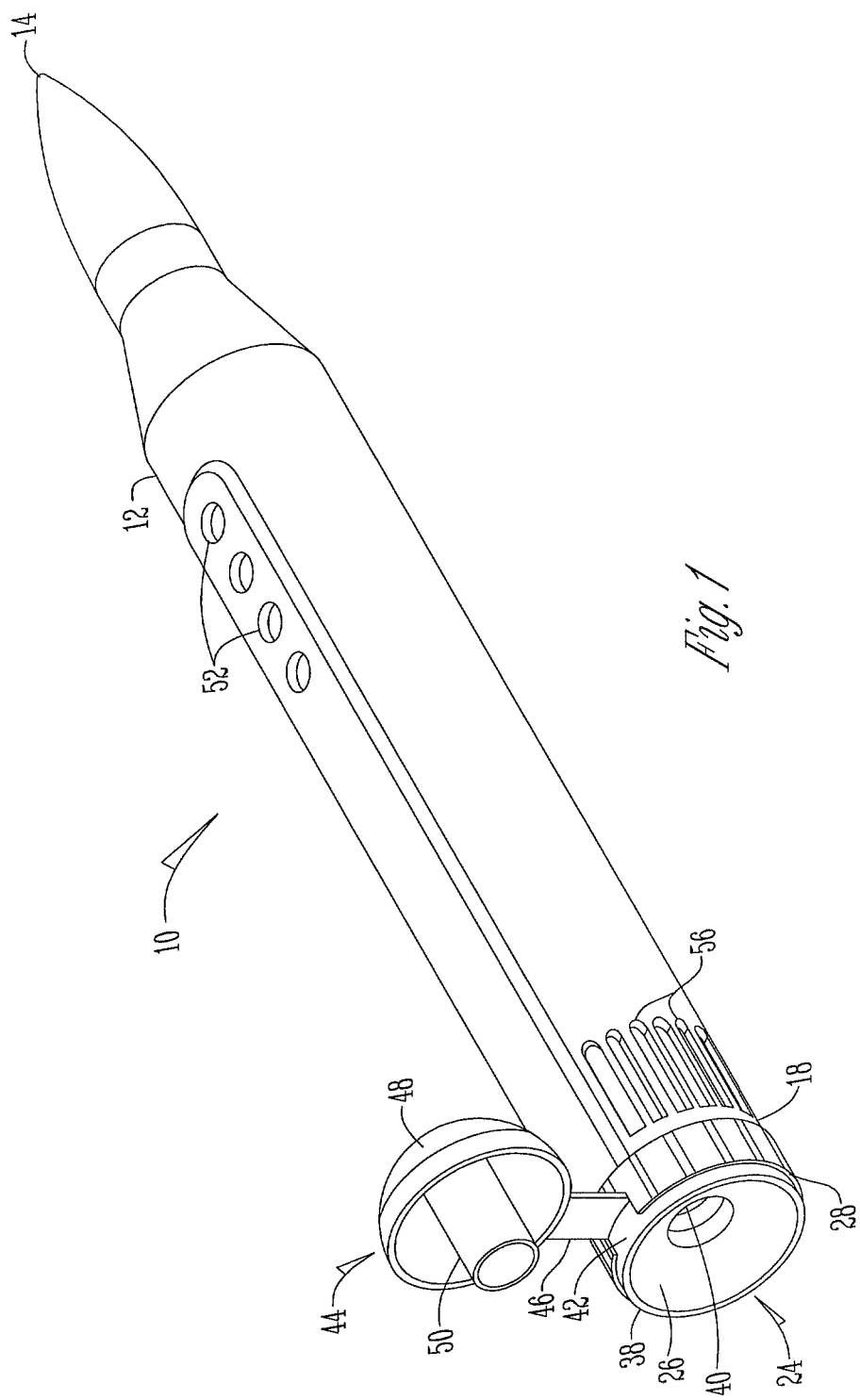
FIG. 1 is a perspective view of a beverage cooling and flavoring device.

Referring to the Figures, the cooling device 10 includes a hollow elongated tube 12 having a first end 14 and a second end 18. In one arrangement the first end 14 and has an opening 16 at the second end 18. The tube 12 is of any shape and in one embodiment the first end 14 is tapered such that the tube 12 looks like a bullet. Adjacent second end 18, on the outer surface 20 of tube 12 are threads 22.

Removably attached to end 18 of tube 12 is a cap 24. The cap 24 has an end wall 26 and a side wall 28 that form a hollow chamber 30. On the inner surface 32 of the side wall 28 are threads 34 that are matingly received by threads 22. While, as an example, the cap 24 is threadably mated to the tube, alternatively the cap 24 is attached to the tube 14 in any conventional manner such as a snap fit, by friction, or the like. Preferably, the cap 24 has a diameter of 0.69 inches and the tube 12 has a diameter of 0.54 inches, such that the device 10 will fit within the opening of a beverage container.

In an alternative embodiment, the end wall 26 tapers downwardly from an outer edge 38 to a central opening 40 to form a funnel shape. Attached to an outer surface 42 of the cap 24 is a lid 44 having a pliable strap 46 that is connected to and extends outwardly from the outer surface 42 of the cap 24. A head portion 48 is attached to the strap 46 and a plug 50 extends outwardly from the head portion 48. Preferably, the head portion 48 is shaped as a partial sphere and has a diameter that engages the outer edge 38 of the cap 24 when flipped to a closed position. Also, the plug 50 is positioned such that it is received within central opening 40 when in a closed position.

In one arrangement, the opening 40 of the cap 24 is arcuate and positioned adjacent the outer edge of the cap. In this embodiment, the plug 50 is also arcuate in shape and sized to be received within the opening 40

Figure 2:
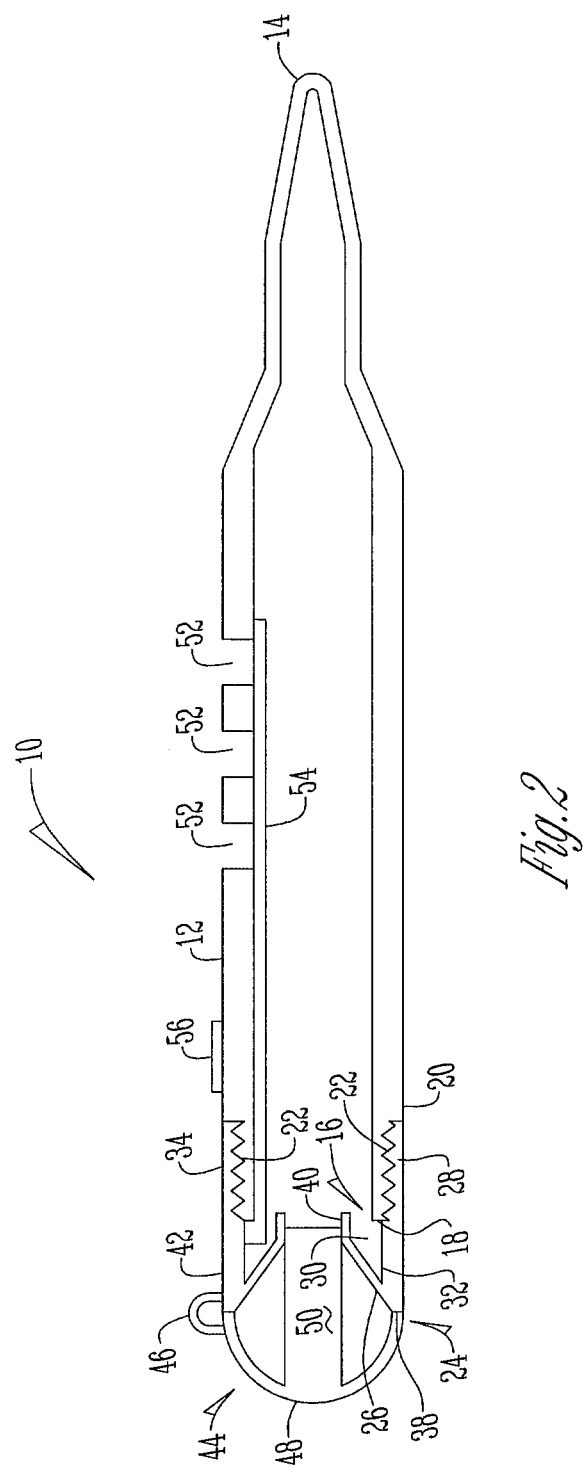
FIG. 2 is a side sectional view of a beverage cooling and flavoring device.
Figure 3:
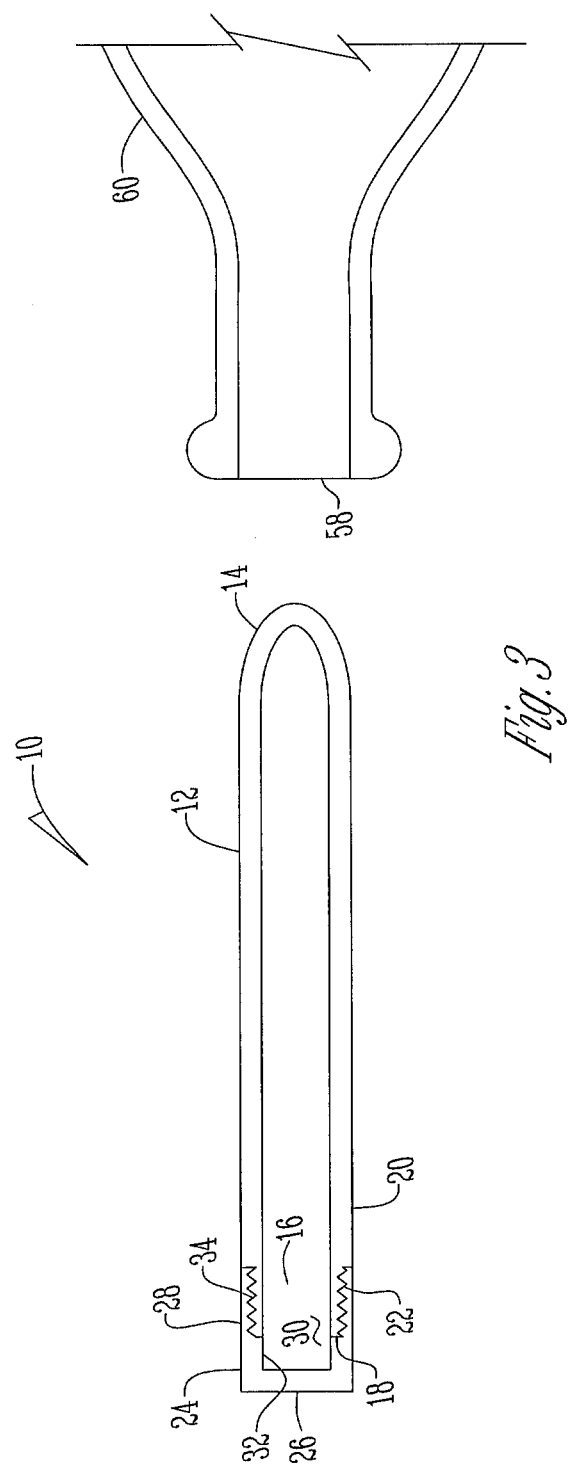
FIG. 3 is a side sectional view of a beverage cooling and flavoring device.
Figure 4:
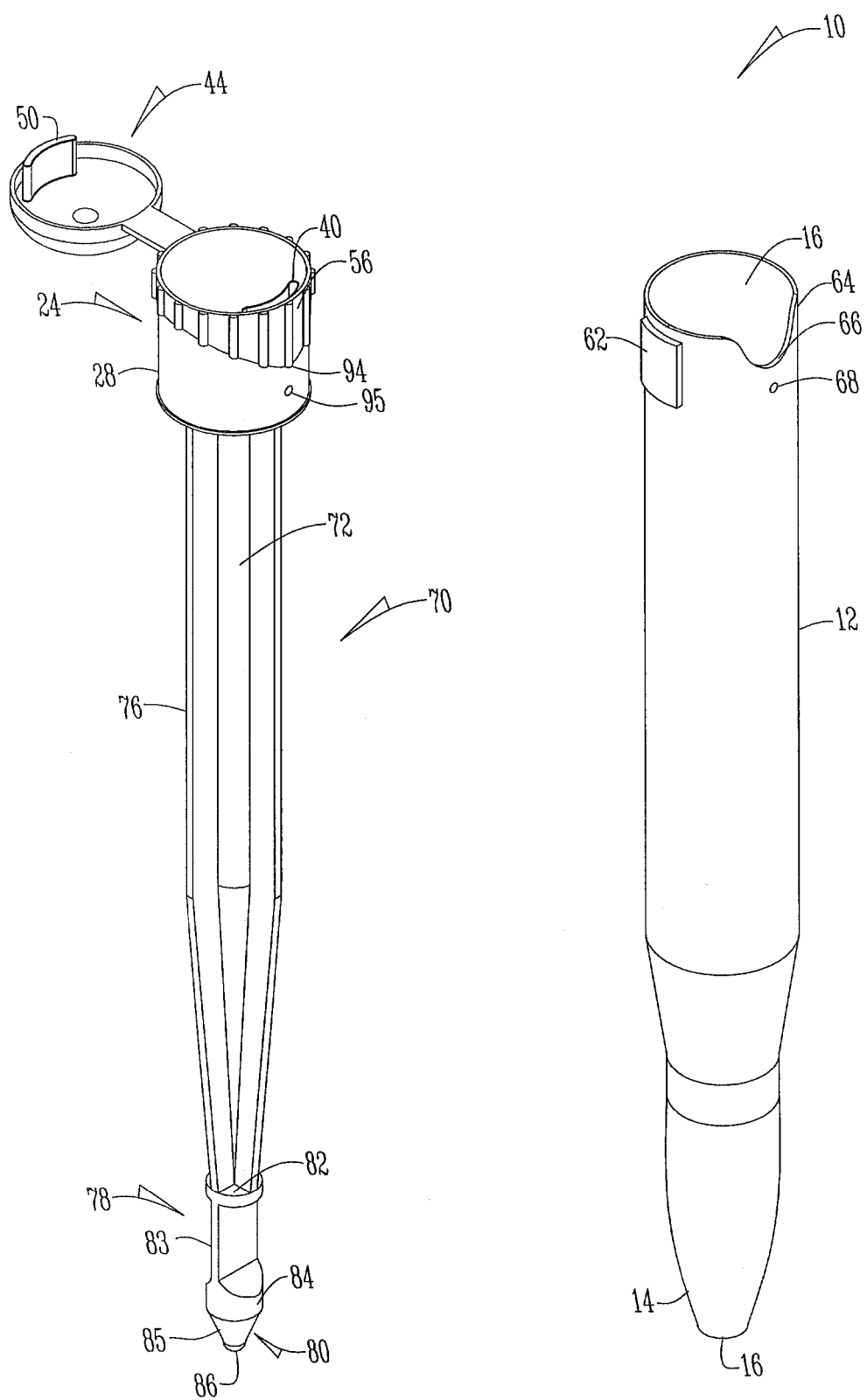
FIG. 4 is a side perspective view of a beverage cooling and flavoring device.
Figure 5:
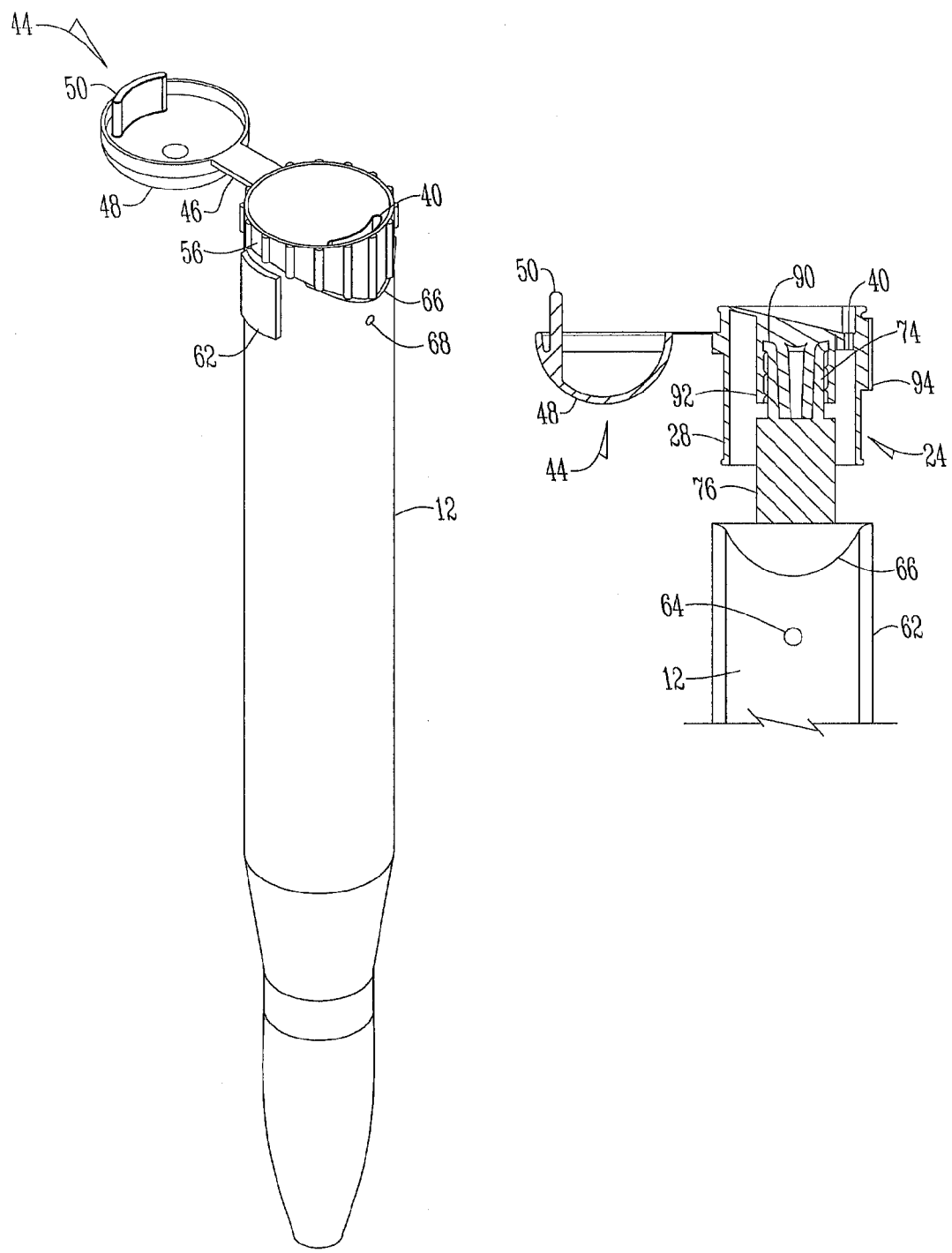
FIG. 5 is a side sectional view of a beverage cooling and flavoring device
Figure 6:
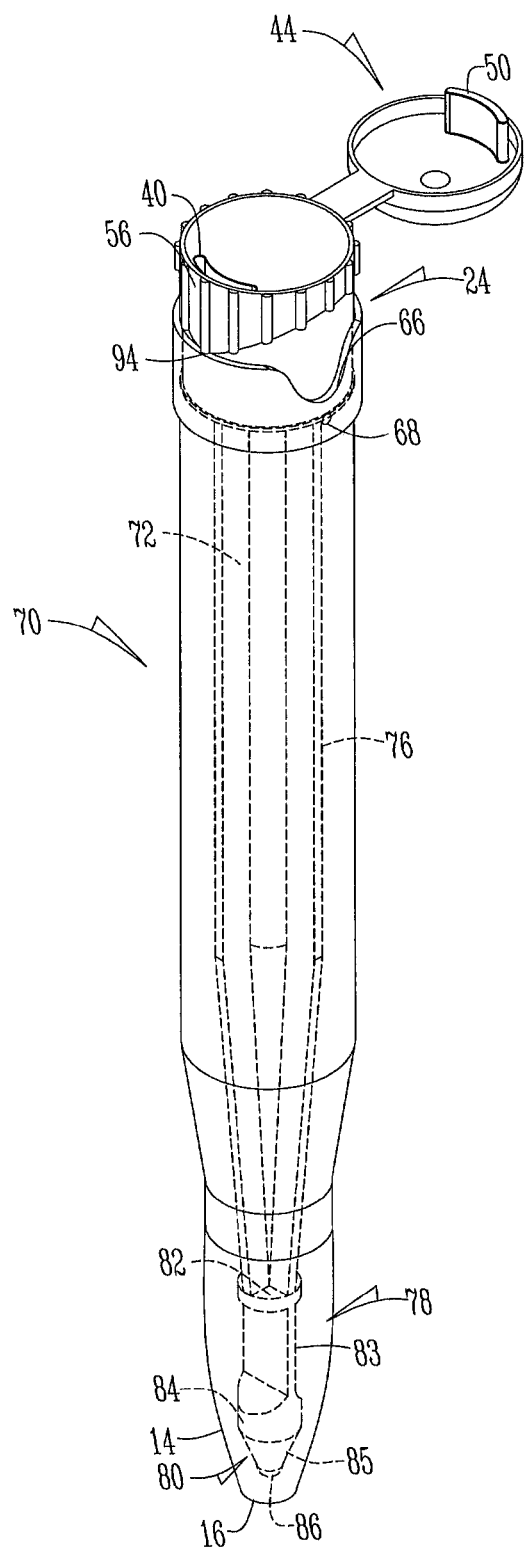
FIG. 6 is a side perspective view of a beverage cooling and flavoring device.

Positioned between the first end 14 and the second end 18 of the tube 12 is at least one, and preferably a plurality of openings 52. Preferred is that the openings 52 are in elongated alignment along the length of the tube 12. Attached to the inner surface 32 of the sidewall 28 of the cap 24 is a closing strip 54. The closing strip 54 extends from the cap 24 into the tube 12 and is positioned to selectively cover and uncover the openings 52 as the cap 24 is rotated from one position to another position. To assist in turning the cap 24, a plurality of gripping protrusions or depressions 56 extend outwardly from the tube 12 adjacent the second end 18. The gripping protrusions 56, as shown in FIG. 2, are located along side openings 52 and along closing strip 54. In another arrangement, as shown in FIG. 1, the gripping protrusions or depression 56 are located along the side opening 52 and not the closing strip 54.

In another embodiment of the invention, the first end 14 and the second end 18 of the hollow elongated tube 12 have openings 16. The second end 18 of the elongated tube 12 has a sidewall 62 that is thicker than the rest of the elongated tube 12 and has a slightly larger diameter. The second end 18 has a top edge 64 with a lowered portion 66. The lowered portion 66 extends downward from the top edge 64 towards the first end 14 and is arcuate in shape. Below the lowered portion 66 is one or more openings 68 in the sidewall 62.

A plunger 70 having an elongated shaft 72 is received within the elongated tube 12. The elongated shaft 72 has a head 74, a first portion 76, a second portion 78, and a tip 80 formed to seal the opening 16 in the second end 18 of the elongated tube 12.

The first portion 76 extends between the head 74 and a first cylindrical end 82 of the second portion 78. In one embodiment, the first portion 76 has a criss-cross structure to provide rigidity to the elongated shaft 72 while taking up a minimal amount of space. The second portion 78 has a flat portion 83 positioned between the first cylindrical end 82 and a second cylindrical end 84. The flat portion 83 acts as a vent to allow liquid to more easily flow from the second end 18.

The tip 80 is connected to and extends downward from the second cylindrical end 84. The tip 80 has a tapered wall 86 that extends to a rounded point 86. The tip 80 is sized and shaped to engage an interior wall 88 of the elongated tube 12 when the cooling device 10 is in a closed position. In one embodiment, the tip 80 is made of rubber or other suitable material to provide for a tighter seal.

The cap 24 is removably attached to the plunger 70. In one embodiment, the cap 24 is threadably connected to the head 74 of the plunger 70 by an opening 90 in a bottom 92 of the cap 24. In other arrangements, the cap 24 is connected to the head 74 by snap fit, frictional engagement, or the like.

The sidewall 28 of the cap 24 has an outward extension 94 formed to be selectively received by the lowered portion 66 of the top edge 64 of the elongated tube 12. In one arrangement, the outward extension 94 is arcuate in shape. Below the outward extension 94 is at least one opening 95. When the outward extension 94 is received by the lowered portion 66 of the elongated tube 12, a lower edge 96 of the outward extension 94 engages the top edge 64 of the lowered portion 66 and the openings 95 of the cap 24 align with the openings 68 in the elongated tube 12 to allow air to enter the top of the elongated tube 12.

In operation, the plunger 70 is attached to the cap 24 and inserted through the second end 18 of the elongated tube 12. The cap 24 is turned to a closed position so that the outward extension 94 of the cap 24 is positioned outside of the lowered portion 66 of the elongated tube 12. In this way the tip 80 of the plunger 70 is positioned within the opening 16 of the first end 14 thereby sealing the first end. The tip 80 engages the interior wall 88 of the elongated tube 12 preventing liquid from exiting.

Next, liquid, such as water, flavored water, flavoring, or an alcoholic beverage is poured into the opening 40 in the cap 24 to fill the elongated tube 12. When filled, the lid 44 is positioned onto the cap 24 so that the plug 50 seals the opening 40 of the cap 24.

To form ice and/or to cool a beverage, the device 10 is placed in a refrigerated space until the liquid freezes or is cooled. Once frozen or cooled, the device 10 is inserted through the opening 58 of the beverage container.

To release liquid through the opening 16 in the first end 14 of the elongated tube 12, the cap 24 is turned and pressed downward to an open position. In the open position the outward extension 94 is received within the lowered portion 66 of the elongated tube 66 so that the lower edge 96 of the outward extension 94 engages the top edge 64 of the lowered portion 66. In this position the plunger 70 extends further through the elongated tube 12 such that the tip 80 moves outside of the elongated tube 12 and liquid is able to pass by the flat portion 83 of the plunger 70 and into the beverage container 60.

Thus a device and method have been disclosed that at the very least meets the stated objectives.

What is claimed:

1. A device for cooling and flavoring a beverage comprising;
    an elongated tube having an open first end and an open second end wherein the open second end has a lowered portion;
    a cap removably received in the second end and connected to a plunger having an elongated shaft that terminates in a tip;
    the cap having an outward extension such that in an open position the outward extension is received within the lowered portion of the elongated tube and the tip extends beyond the open first end.

2. The device of claim 1 further comprising the elongated tube having at least one opening adjacent the lower portion and the cap having at least one opening adjacent the outward extension.

3. The device of claim 1 further comprising an opening adjacent an outer edge of the cap.

4. The device of claim 1 further comprising the plunger having a first portion and, a second portion.

5. The device of claim 4 wherein the first portion has a criss-cross shape.

6. The device of claim 4 wherein the second portion has a flat construction.

7. A method for cooling and flavoring a beverage, comprising the steps of:
    providing an elongated tube having an open first end and an open second end with a gap;
    providing a cap connected to a plunger, wherein the cap has an outward extension that is selectively received in a lowered portion of the elongated tube;
    rotating the cap to a closed position;
    filling the elongated tube with a desired liquid through an opening in the cap;
    freezing the desired liquid; and
    rotating the cap so that to an open position.

* * * * *